US012637903B2

(12) United States Patent
Greening et al.

(10) Patent No.: US 12,637,903 B2
(45) Date of Patent: May 26, 2026

(54) WINDOW BLIND SUPPORT ASSEMBLY

(71) Applicant: LOUVER-LITE LIMITED, Hyde (GB)

(72) Inventors: Andrew Greening, Hyde (GB); Antony Barnes, Hyde (GB)

(73) Assignee: LOUVER-LITE LIMITED, Hyde (GB)

( * ) Notice: Subject to any disclaimer, the term of this patent is extended or adjusted under 35 U.S.C. 154(b) by 201 days.

(21) Appl. No.: 18/277,835

(22) PCT Filed: Feb. 22, 2022

(86) PCT No.: PCT/EP2022/054461

§ 371 (c)(1),
(2) Date: Aug. 18, 2023

(87) PCT Pub. No.: WO2022/180063

PCT Pub. Date: Sep. 1, 2022

(65) Prior Publication Data

US 2024/0125171 A1 Apr. 18, 2024

(30) Foreign Application Priority Data

Feb. 23, 2021 (GB) ..................................... 2102572

(51) Int. Cl.
*E06B 9/42* (2006.01)
*E06B 9/266* (2006.01)
(Continued)

(52) U.S. Cl.
CPC .............. *E06B 9/266* (2013.01); *E06B 9/327* (2013.01); *E06B 9/42* (2013.01); *E06B 2009/2625* (2013.01)

(58) Field of Classification Search
None
See application file for complete search history.

(56) References Cited

U.S. PATENT DOCUMENTS 6,817,402 B1 * 11/2004 Fraczek .................... E06B 9/42 248/267
10,334,977 B2 * 7/2019 Filko ......................... E06B 9/24
(Continued)

FOREIGN PATENT DOCUMENTS

DE 102011011113 A1 8/2012
EP 2474702 B1 * 9/2014 ............... E06B 9/42
(Continued)

OTHER PUBLICATIONS

International Search Report and Written Opinion issued on May 23, 2023 in PCT Patent Application No. PCT/EP2022/054461.

*Primary Examiner* — Phi D A
(74) *Attorney, Agent, or Firm* — Billion & Armitage

(57) ABSTRACT

A window blind support assembly including one or more elongate support members; a mounting bracket; and a locating element; wherein the or each elongate support member defines a longitudinal channel; the locating element is slidably coupled to the or one of the elongate support members via the longitudinal channel; the mounting bracket defines a retaining portion and a connecting portion; and the retaining portion of the mounting bracket is secured to the elongate support member at a desired position via the locating element.

12 Claims, 7 Drawing Sheets

(51) Int. Cl.

| | |
|---|---|
| ***E06B 9/327*** | (2006.01) |
| *E06B 9/262* | (2006.01) |

(56) References Cited

U.S. PATENT DOCUMENTS

| | | | | |
|---|---|---|---|---|
| 2013/0098561 | A1* | 4/2013 | Mullet | E06B 9/50 160/39 |
| 2017/0079459 | A1* | 3/2017 | Filko | E04F 10/0685 |
| 2021/0000278 | A1 | 1/2021 | Filko | |
| 2022/0183495 | A1* | 6/2022 | Filko | E06B 9/17015 |

FOREIGN PATENT DOCUMENTS

| | | | |
|---|---|---|---|
| WO | 2006109009 | A1 | 10/2006 |
| WO | 2020035613 | A1 | 2/2020 |
| WO | 2020053450 | A1 | 3/2020 |

* cited by examiner

WINDOW BLIND SUPPORT ASSEMBLY

The present invention relates to window blind support assemblies.

Window blind systems that include a frame to which a window blind is affixed are described in WO2006/109009 and WO2020/035613. WO2006/109009 describes a window blind system which is secured to a window via clips that are inserted between a glazing panel and a window frame, and WO2020/035613 is secured to a window via a magnetic coupling.

However, it has been found that the known window blind systems are not suitable for all types of windows. Accordingly, there is a need for a different window blind system.

According to a first aspect of the present invention, there is provided a window blind support assembly including one or more elongate support members; a mounting bracket; and a locating element; wherein the or each elongate support member defines a longitudinal channel which includes a floor element; the locating element is slidably coupled to the or one of the elongate support members via the longitudinal channel; the locating element includes a resiliently deformable compression element; the mounting bracket defines a retaining portion and a connecting portion; and the retaining portion of the mounting bracket is secured to the support member between the floor element of the longitudinal channel and the resiliently deformable compression element of the locating element whereby the retaining portion of the mounting bracket is secured within the longitudinal channel of the elongate support member at a desired position via the locating element.

Thus, the present invention provides a one or more support members which may be secured to a substrate surrounding a window or glazing panel. The longitudinal channel of the or each support member receives the retaining portion of a mounting bracket, which is secured in the desired location relative to the channel via the locating element. As such, the mounting bracket may be secured relative to the support member at any point within a predefined range defined by the channel. Thus, according to the invention, the retaining portion of the mounting bracket is located within the longitudinal channel of the support member.

A window blind may then be secured to the support assembly via the or each mounting bracket, for example, via the connecting portion of the mounting bracket. The window blind may be secured directly to the mounting bracket or it may be secured via an intermediate component, such as a window blind frame.

It will be appreciated that the resiliently deformable compression element of the locating element faces the floor element of the longitudinal channel and that the compression element may be deflected away from the floor element in use. Such an arrangement provides a frictional coupling between the retaining portion of the mounting bracket and the floor element of the channel which prevents or resists longitudinal or axial movement of the mounting bracket within the channel.

It may be desired to prevent lateral displacement of the locating element relative to the support member channel. Accordingly, the longitudinal channel may be defined by the floor element; a pair of opposed side walls which define between them a first gap; and an arm which is spaced from the floor portion, which projects from one of the opposed side walls, and overlies a part of the floor element. The side walls prevent undesired sideways or lateral displacement of the locating element from the channel. The opposed side walls define between them a first gap. The first gap is suitably greater than the width of the locating element, such that the locating element may be located between the side walls of the channel. In order to prevent an upward displacement (i.e. away from the floor of the channel) of the locating element, the arm overlies a portion of the locating element. Optionally, the arm engages an upper portion of the locating element. In this way, the locating element may be retained within the channel by the side walls and the inwardly projecting arm. The arm may include a downwardly (i.e. towards the floor) projecting lip. The lip may engage a receiving portion of the locating element. For example, an upwardly facing surface (i.e. facing away from the floor) of the locating element may define a locating element channel or a recess which receives the lip. The locating element channel/recess is suitably aligned to be parallel with a longitudinal axis of the locating element (and therefore also parallel to the longitudinal axis of the support member channel) such that the engagement of the lip with the locating element channel/recess does not interfere with the longitudinal displacement of the locating element within the longitudinal channel defined by the elongate support element.

With the or each locating element disposed within a respective support member channel, it may be difficult to move the locating element within the channel. Accordingly, the locating element may include a tab which extends or projects out of the channel through the first gap. A user may grab the protruding tab in order to move the locating element within the channel.

As noted above, a frictional coupling may be provided between the retaining portion of the or each mounting bracket and the floor element of the respective support member channel. However, it may be desirable to increase the frictional force which resists movement of the mounting bracket relative to the support member. Accordingly, the locating element may include one or more resiliently deformable friction members which engage one of the opposed side walls or both of the opposed side walls. For example, the resiliently deformable friction member may be disposed on one side of the locating element and an engagement surface may be provided on the opposite side of the locating element. In this way, the resiliently deformable friction member engages a first side wall and urges the opposing engagement surface into frictional engagement with the opposing, second side wall. Accordingly, the locating element generates a frictional engagement with both of the opposing side walls, which in turn resists unwanted displacement of the locating element within the channel.

If a user wishes to move the locating element within the channel, a lateral force may be applied to the locating element (e.g. via the projecting tab) which deforms the resiliently deformable friction member and disengages the engagement surface from the second side wall. A longitudinal or axial force may then be applied to the locating element, which is greater than the frictional force between the resiliently deformable friction member and the first side wall, which moves the locating element within the channel. When the locating element is in the desired location, both the axial and lateral forces are removed. When the lateral force is removed, the resiliently deformable friction members act against the first wall to urge the engagement surface into frictional engagement with the second wall.

Suitably, the connecting portion of the mounting bracket projects transversely from one side of the retaining portion and extends from the channel. In other words, the plane of the connecting portion may be arranged substantially perpendicular to the plane of the retaining portion. For example, if the retaining portion of the mounting bracket is retained parallel to the floor element of the channel, the connecting portion of the mounting bracket may extend outwards, away from the floor element and project out of the channel. In embodiments, in which the channel includes an arm which overlies a part of the floor element, the connecting portion of the mounting bracket suitably projects upwards from a location which is not covered by the arm.

The connecting portion of the mounting bracket may couple a window blind to the support assembly, either directly or via an intermediate component.

In an embodiment of the invention, the assembly includes two or more elongate support members and each of the support members includes at least one locating element and at least one mounting bracket. In this embodiment, the support members may be spaced apart from each other or they may be arranged such that a portion (e.g. one end) of a first support member is located adjacent to a portion (e.g. one end) of a second support member, for example L-shaped.

In embodiments in which one end of a first support member is located adjacent to one end of a second support member, the pair of adjacent elongate support members may be connected via a corner bracket. In other words, the corner bracket may connect the adjacent ends of the two support members.

In a yet further embodiment, 3, 4, 5, 6, 7 or 8 elongate support members may be arranged in the form of a support member frame. The frame may be continuous (i.e. each end of an elongate support member is connected to an adjacent end of a neighbouring elongate support member, or the frame may be open on at least one side. Suitably, four elongate support members are arranged in a rectangular frame. Thus, a support member frame may comprise four connected elongate support members arranged in a rectangular configuration.

It may be commercially desirable to form the support members as elongate extrusions which can be cut to length. In such embodiments, it may be useful to secure the window blind support assembly to a substrate via the or each corner bracket. In this way, apertures or other fixing elements need not be formed in the support members. Instead, the or each corner bracket may include one or more fixing elements, such as screw holes for example. As such, the or each bracket may be fixed to a substrate via the fixing element(s) and the support members connected to the or each corner bracket are thereby secured to the substrate.

As disclosed in WO2006/109009, a frame may be secured to the mounting brackets. The difference being that in WO2006/109009, the brackets are engaged with a window gasket and in the present invention, the brackets are engaged with the elongate support member(s) and form part of a support assembly. Thus, in an embodiment of the invention, the support assembly further includes a window blind frame member coupled to the elongate support member via the connecting portion of the mounting bracket.

In an embodiment of the invention, the window blind support assembly includes two elongate support members; the elongate support members are connected together via a support member corner bracket (e.g. to form an L-shaped arrangement); at least one of the support members includes a respective mounting bracket secured thereto via a locating element; the support assembly further includes two window blind frame members connected together via a frame member corner bracket (e.g. also forming an L-shaped arrangement); and each of the window blind frame members is coupled to a respective one of the elongate support members via the connecting portion of the or each mounting bracket.

The window blind support assembly suitably surrounds a window. As windows tend to be rectangular, the window blind support assembly suitably includes a support member frame comprising four elongate support members arranged in a rectangular configuration, wherein each corner of the rectangular arrangement includes a support member corner bracket which connects the adjacent ends of the respective support members. For example, the support member frame may include four elongate support members and four support member corner brackets, wherein the elongate support members are arranged in a rectangular configuration and the adjacent ends of the support members are connected together via a respective one of the support member corner brackets. At least two of the elongate support members suitably further include a respective mounting bracket secured thereto via a locating element. The support assembly may further include four window blind frame members and four frame member corner brackets, wherein the window blind frame members are arranged in a rectangular configuration that corresponds to the rectangular configuration of the elongate support members, and the adjacent ends of the window blind frame members are connected together via a respective one of the frame member corner brackets; and the window blind frame members may be coupled to the elongate support members via the connecting portion of the mounting brackets. Thus, the rectangular window blind frame arrangement may be coupled to the rectangular support member frame arrangement via the mounting brackets secured to the support members.

As described in WO2006/109009, the connecting portion of the mounting bracket may connect a window blind frame member to the respective elongate support member. In an embodiment of the present invention, the mounting brackets releasably secure a window blind frame to the support member frame.

The mounting bracket comprises a retaining portion and a connecting portion and the connecting portion suitably defines a connecting portion plane. The connecting portion may include a connecting portion body and one or more locators which extend from the body and project from one side of the connecting portion plane. The locators suitably resist removal of the frame member from the connecting portion of the mounting bracket. This is achieved by providing the frame member with a pair of spaced apart projecting walls and disposing the or each locator between the projecting walls. Such an arrangement provides a frictional coupling between the locators and the frame member projecting walls. It also resists the frame member from twisting relative to the connecting portion of the mounting bracket. The connecting portion may further include a locking lug which extends out of the other side of the connecting portion plane to retain the connecting portion of the mounting bracket in position relative to the blind frame member. The locking lug is suitably resiliently deformable. It is an optional feature of the invention that the locking lug releasably engages the blind frame member, for example, one of the projecting walls of the blind frame member.

The connecting portion may further include one or more serrated portion.

In an embodiment, the body of the connecting portion includes a resiliently deformable stem extending therefrom, wherein the proximal end of the stem extends from the body of the connecting portion and the locking lug is disposed at the distal end of the stem. The resiliency of the stem allows the lug to be temporarily deflected inwards (towards the connecting portion plane). This permits the resiliently deformable lug to engage a lug receiving portion of the blind frame.

Optionally, the locking lug of the connecting portion is located between a pair of locators.

Suitably, the retaining portion of the mounting bracket is substantially planar and defines a retaining portion plane. Optionally, the connecting portion plane is substantially orthogonal to the retaining portion plane. Thus, the mounting bracket may be generally L-shaped.

As noted above, when the connecting portion includes a locking lug, the lug is suitably received by a slot defined by the blind frame member. The co-operating slots may be formed in the extruded portion of the frame in a separate step subsequent to extrusion. The extruded portion is typically, although not exclusively, produced without the slots. The slots may be subsequently created using a cutting jig or similar tool prior to assembly of the frame. This allows the co-operating slots to be placed in the optimum position for holding the window blind frame securely relative to the support members.

Thus, where present, the window blind frame members suitably include a pair of spaced apart parallel walls, wherein one of the walls includes a slot configured to receive therein a locking lug of the mounting bracket.

The locators suitably function to resist movement of the connecting portion such that the locking lug remains engaged with the corresponding slot.

The mounting bracket may be as defined and described in WO2006/109009.

According to a second aspect of the invention, there is provided a window blind comprising a window blind support assembly as defined anywhere hereinabove and a deployable blind assembly including a headrail or a roller tube and a blind substrate, wherein the headrail or roller tube of the deployable blind substrate is secured to the or one of the elongate support members. Where the headrail or roller tube is coupled to one of the elongate support members, the elongate support member to which the headrail or roller tube is secured is suitably an upper elongate support member. In other words, it is the uppermost elongate support member when the support assembly is in situ. The deployable blind assembly may be secured directly to the respective elongate support member or it may be secured via an intermediate component, such as, for example, a window blind frame member, which in turn is coupled to the elongate support member.

In the context of the present invention, "deployable blind assembly" refer to window blinds that have a retracted configuration in which the blind substrate covers a minimum portion of the glazing panel, and a deployed configuration in which the blind substrate covers substantially all of the glazing panel. The skilled person will also appreciate that deployable blind assemblies typically also have a partially deployed configuration in which the blind substrate covers desired portion of the glazing panel. In other words, in a deployable blind, the blind substrate may be moved relative to the frame. Such movement is typically within the plane of the frame.

In an embodiment of the invention, the blind substrate is formed from a fabric material.

In a further embodiment of the invention, the deployable blind assembly includes a blind substrate which is deployable from a roller tube and the roller tube is secured to the window blind support assembly via roller tube supports (e.g. a pair of opposed roller tube supports). The term "roller blind" includes any blind that is operated via the rotation of a roller tube. Such blinds include conventional roller blinds, roller blinds which include a return defined by the blind substrate within which is located a bottom bar, and pleated blinds, cellular blinds or Roman blinds which are deployed/retracted via the rotation of a roller tube.

The roller tube supports may be secured to the window blind support assembly and the roller tube may be rotatably coupled to the roller tube supports. For example, the roller tube supports may include a spindle about which the roller tube is rotatably coupled. Optionally, one of the roller tube supports may comprise a control end via which a user may rotate the roller tube to deploy or retract the blind substrate.

In an embodiment of the invention, the deployable window blind assembly is a roller blind as defined above which includes a roller tube, a top elongate support member (i.e. an uppermost support member in use) of the window blind support assembly includes a corner bracket at each end thereof, and the corner brackets each define a spindle about which the roller tube may rotate. An example of such an arrangement is described in WO 2020/053450.

In an alternative embodiment, the deployable window blind assembly includes a blind substrate which is deployable from a headrail and the headrail is secured to the window blind support assembly via headrail supports (e.g. a pair of opposed headrail supports). Window blinds which include a blind substrate that is deployable from a headrail include pleated blinds, cellular blinds, Roman blinds, vertical blinds and Venetian blinds. In such embodiments, the headrail is suitably secured either directly to the top elongate support member of the support assembly or to a pair of opposed corner brackets disposed at each end of the top support member of the support assembly, or to a pair of opposed corner brackets disposed at each end of a top window blind frame member coupled to the top support member of the support assembly.

In an embodiment of the second aspect of the invention, the window blind support assembly further includes one or more window blind frame members coupled to respective elongate support members, and the headrail or roller tube is secured to the support assembly via the or one of the window blind frame members.

In the case of certain blinds, such as vertical blinds and Venetian blinds, the blind substrate may be formed from a plurality of blind substrate elements, wherein each blind substrate element defines a longitudinal axis and is arranged to move laterally and to be rotated about its longitudinal axis. In the context of the subject invention, lateral movement relates to displacement of the individual blind substrate elements in a direction perpendicular to their longitudinal axis. For example, in the case of vertical blinds, the longitudinal axes are substantially vertical axes and the lateral movement of the vertical blind substrate elements is typically horizontally. Similarly, in the case of Venetian blinds, the longitudinal axes are substantially horizontal axes and the lateral movement of the Venetian blind substrate elements is typically vertically.

According to a third aspect of the invention, there is provided a window of a building, wherein the window comprises a glazing panel located within a window frame and a substrate surrounding the window frame, wherein the window further includes a window blind according to the second aspect of the invention as defined hereinabove, wherein the or each elongate support member of the window blind is secured to the substrate or the window frame.

In an embodiment of the third aspect of the invention, the window blind includes an assembly comprising four elongate support members and four support member corner brackets; the elongate support members are arranged in a rectangular configuration, wherein adjacent ends of the elongate support members are connected together via a respective one of the support member corner brackets; each of the corner brackets includes a fixing element; and the elongate support members are secured to the substrate or the window frame via the respective corner bracket fixing elements.

The fixing elements are suitably screw holes defined by the corner brackets and the corner brackets may be secured to the substrate via screws.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which:

FIGS. 1*a* to 1*d* show views of a locating element which forms part of a window blind support assembly according to the invention;

FIG. 2 shows a perspective view of the locating element shown in FIG. 1 disposed within a channel defined by an elongate support member and securing a mounting bracket to the elongate support member;

FIG. 3*a* shows a cross section through the elongate support member shown in FIG. 2;

FIG. 3*b* shows a cross section through the elongate support member with a locating element in place;

FIG. 3*c* shows a perspective view of the elongate support member and locating element of FIG. 3*b;*

FIG. 4*a* shows a perspective view of a window blind support assembly comprising four elongate support members arranged in a rectangular configuration;

FIG. 4*b* shows a plan view from above of the arrangement shown in FIG. 4*a;*

Figure 1B:
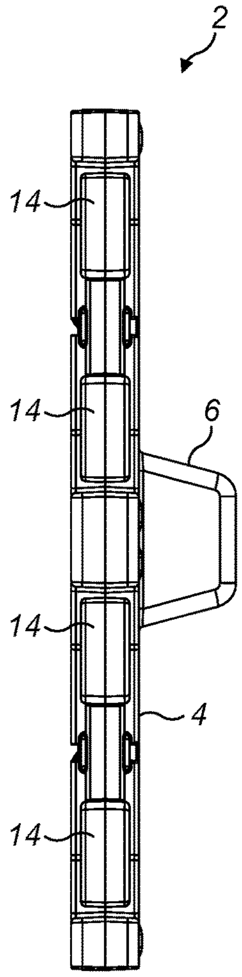
Figure 1A:
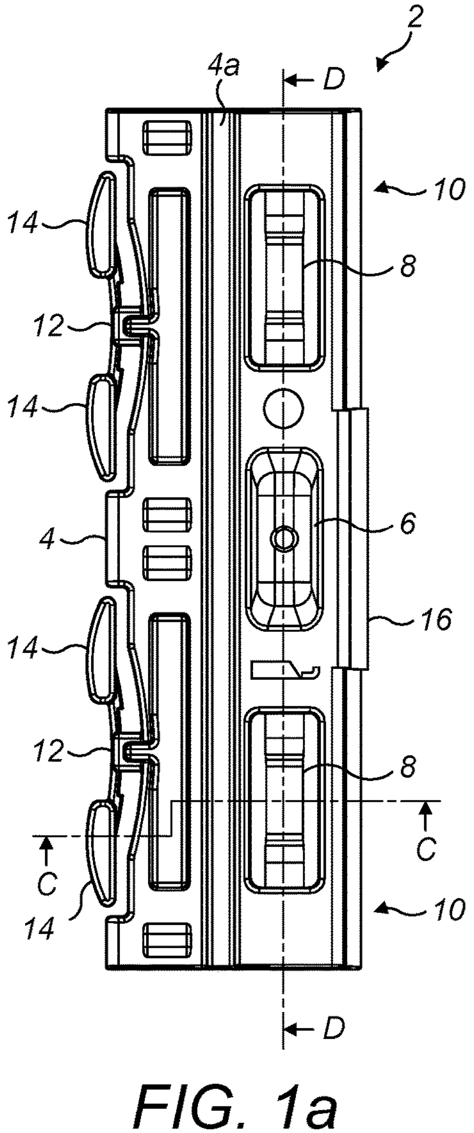
Figure 1C:
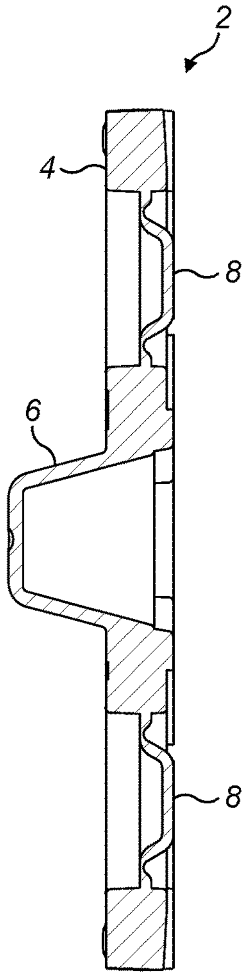
Figure 1D:
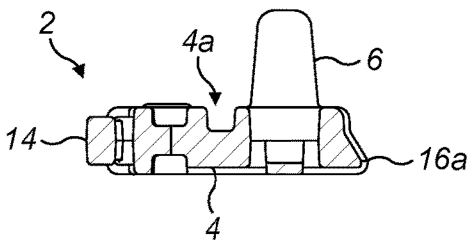

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

FIGS. 1*a* to 1*d* show a locating element 2 which includes a main body portion 4. Projecting outwards from the main body portion 4 is a tab or handle portion 6 which is grasped by a user in order to move the locating element 2.

The locating element 2 further includes a pair of mounting bracket retaining elements 8, which are resiliently deformable spring elements. Aligned with the mounting bracket retaining elements 8 are corresponding mounting bracket recesses 10, which are discussed in more detail below.

On the opposite side of the main body portion 4 to the mounting bracket recesses 10 are two resiliently deformable friction members 12. Each of the resiliently deformable friction members 12 includes a pair of friction pads 14. The friction pads 14 extend beyond the main body portion 4 of the locating element 2.

Disposed between the mounting bracket recesses 10 (and opposite to the resiliently deformable friction members 12) is an engagement portion 16 of the main body portion 4. The engagement portion 16 defines a friction surface 16*a.*

The main body portion 4 further defines a longitudinal channel 4*a* in its upwardly facing surface.

Figure 2:
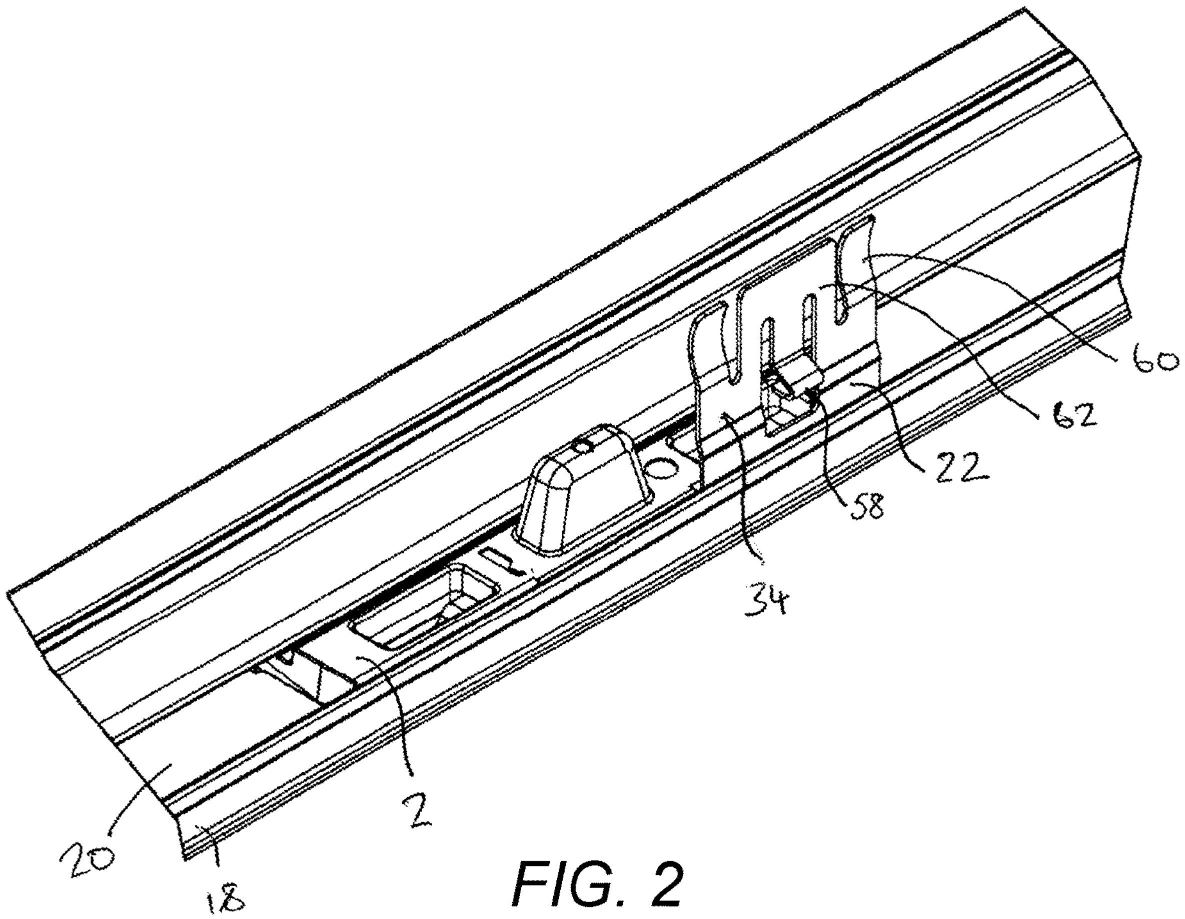

FIG. 2 shows an elongate support member 18 which defines therein a channel 20. Disposed within the channel 20 is the locating element 2 and a mounting bracket 22.

Figure 3A:
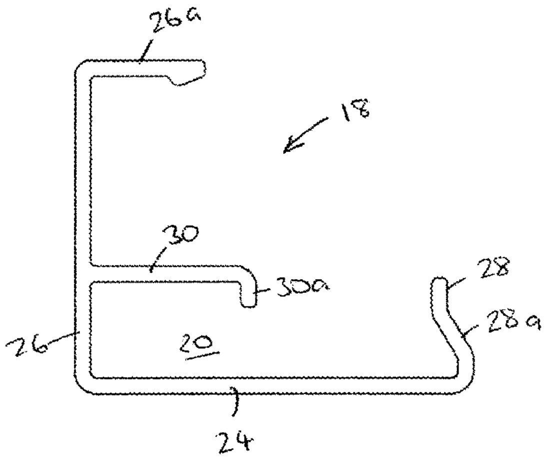
Figure 3B:
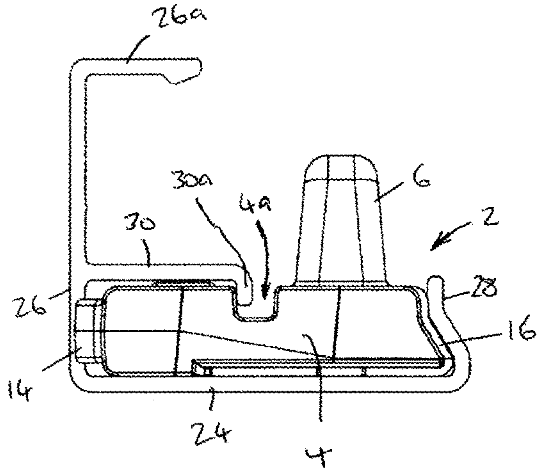
Figure 3C:
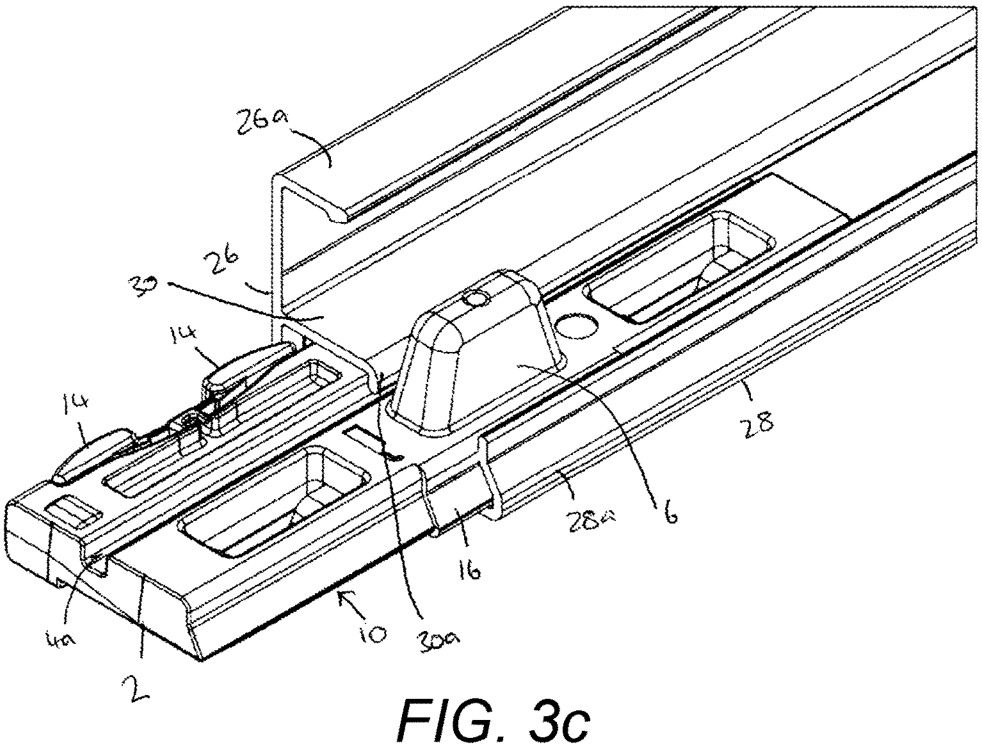

As can be seen from FIGS. 3*a*, 3*b* and 3*c*, the channel 20 is defined by a channel floor 24 and a pair of opposed side walls 26, 28. The friction pads 14 engage the side wall 26 and urges the opposing engagement portion 16 into contact with the opposing side wall 28, whereby the friction surface 16*a* frictionally engages the side wall 28. As noted from FIGS. 3*a*, 3*b* and 3*c*, the side wall 28 defines a concave portion 28*a* which conforms to the corresponding shape of the engagement portion 16 of the locating element 2.

In this configuration, the frictional forces between the friction pads 14 and side wall 26, and the frictional force between the friction surface 16*a* and the side wall 28 resist longitudinal displacement of the locating element 2 within the channel 20.

In order to longitudinally displace the locating element 2 within the channel 20, a user grasps the tab 6 and urges the locating element towards the side wall 26. The resiliently deformable friction members are deformed by this action and the engagement portion 16 is disengaged from the side wall 28. In this configuration, a user may apply a translational force which is greater than the frictional force between the friction pads 14 and the side wall 26 in order to displace the locating element 2 within the channel 20.

The elongate support member 18 further includes an upper arm 30, which extends inwardly over a portion of the channel 20 from the side wall 26. The upper arm 30 includes a downwardly projecting lip 30*a*. The upper arm 30 retains the locating element 2 within the channel 20, as it overlies a portion of the locating element 2 and prevents any outward displacement of the locating element 2 from the channel 20.

The side wall 26 extends upwards beyond the upper arm 30 and terminates in an upper wall portion 26*a.*

The mounting bracket 22 (shown in cross section in FIG. 7) includes a retaining portion 32 and a connecting portion 34. The retaining portion 32 is located between the channel floor 24 and a respective one of the mounting bracket retaining elements 8. The resiliently deformable nature of the retaining elements 8 secures the retaining portion 32 of the mounting bracket 22 relative to the support member 18.

Figure 4A:
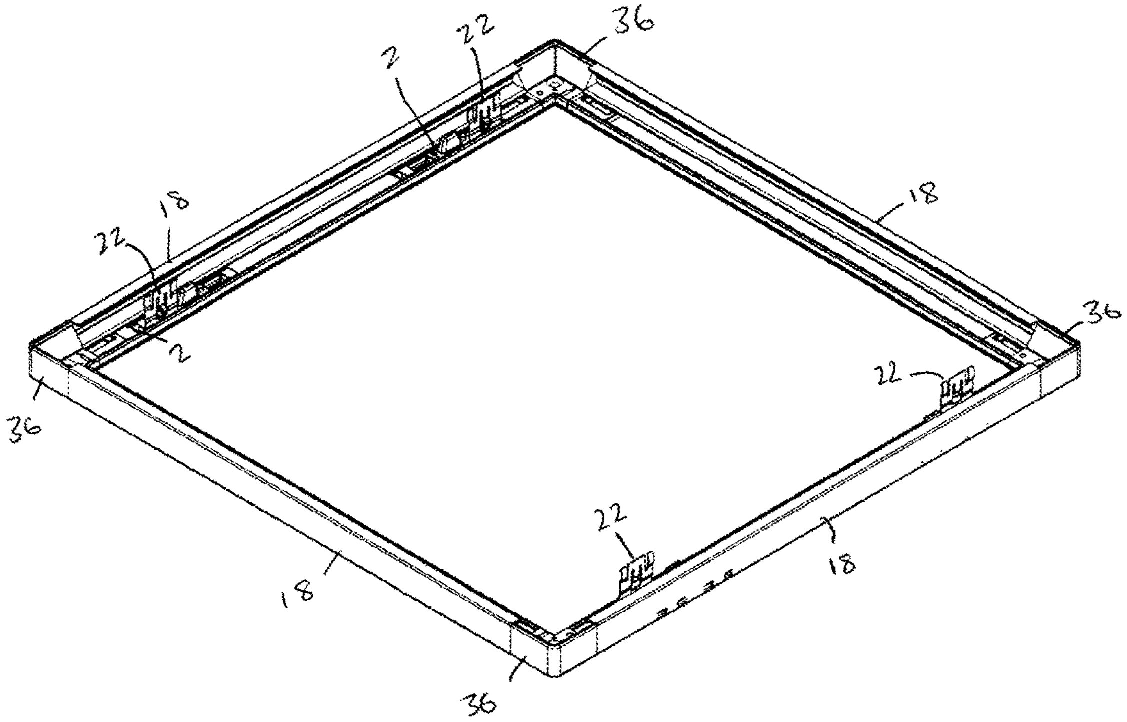
Figure 4B:
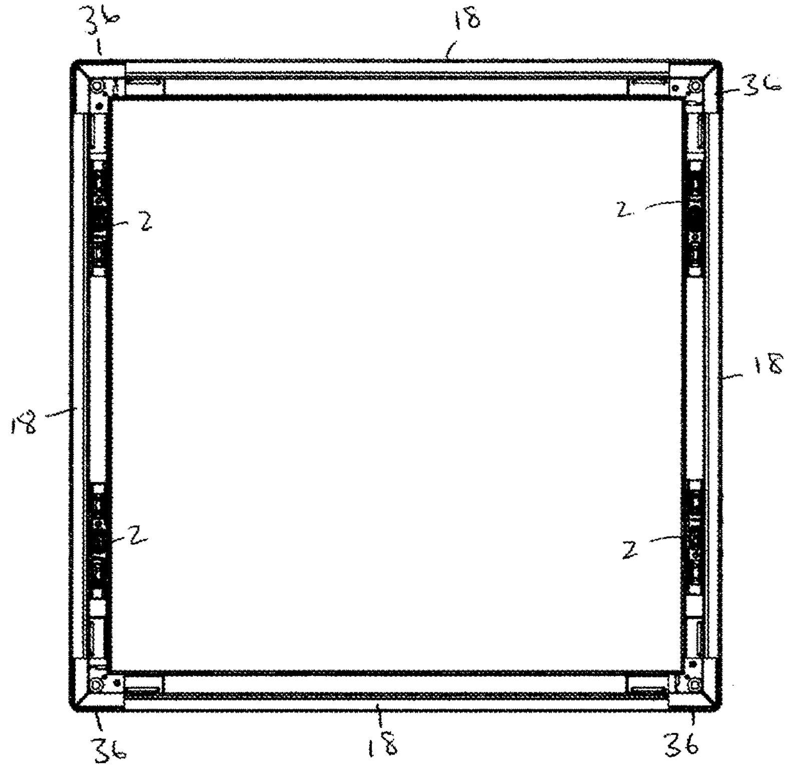

FIGS. 4*a* and 4*b* show four elongate support members 18 arranged in a rectangular configuration and coupled together via four corner brackets 36. As will be seen in FIGS. 4*a* and 4*b*, two of the elongate support members 18 have two locating elements 2 coupled to them and two of the elongate support members 18 have no locating elements coupled to them. However, the skilled person will appreciate that the elongate support members 18 which are shown in FIGS. 4*a* and 4*b* with no associated locating elements may instead each include one or two respective locating elements 2.

Figure 5:
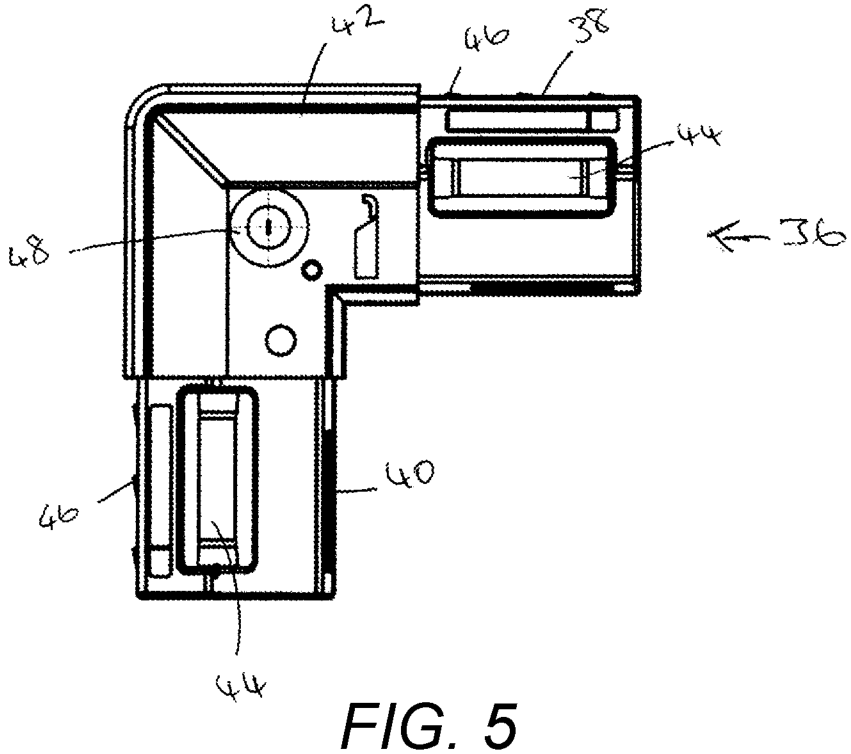
FIG. 5 shows a corner bracket of the support assembly shown in FIG. 4 in more detail.

The corner brackets 36 are shown in more detail in FIG. 5. Each corner bracket is L-shaped and includes a first leg 38 and a second leg 40, both of which extend from a central portion 42. The first and second legs 38, 40 both include respective upper friction elements 44 and lateral friction elements 46 which engage the side wall 26 and the upper arm 30 which define parts of the channel 20. Thus, the first and second legs 38, 40 are located within respective channels 20 of elongate support members 18 adjacent to the corner bracket 36 and the respective first and second legs 38, 40 of the corner bracket 36 form friction fits within the channels 20.

The central portion 42 of the corner bracket 36 defines a screw hole 48 via which the corner bracket may be secured to a substrate. The skilled person will appreciate that with each of the four corner brackets 36 secured to a substrate and each of the four elongate support members 18 secured at each end to a respective corner bracket, the rectangular configuration of the support members 18 and corner brackets 36 shown in FIG. 4 may be fixed to the substrate.

It will also be appreciated that each of the corner brackets 36 may define further or alternative screw holes such that the support assembly shown in FIG. 4 may be fixed to a substrate that lies parallel to the plane of the support member 18 or to a substrate which defines a plane perpendicular to the plane of the support members 18.

Figure 6:
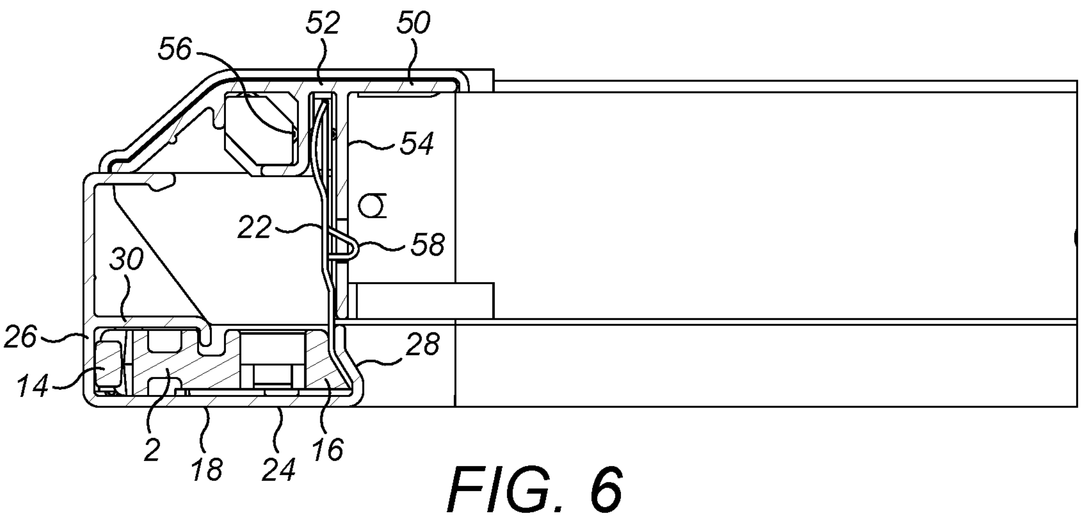
FIG. 6 shows a cross section through the window blind support assembly shown in FIG. 4 with a window blind frame member secured to the mounting bracket.
Figure 7:
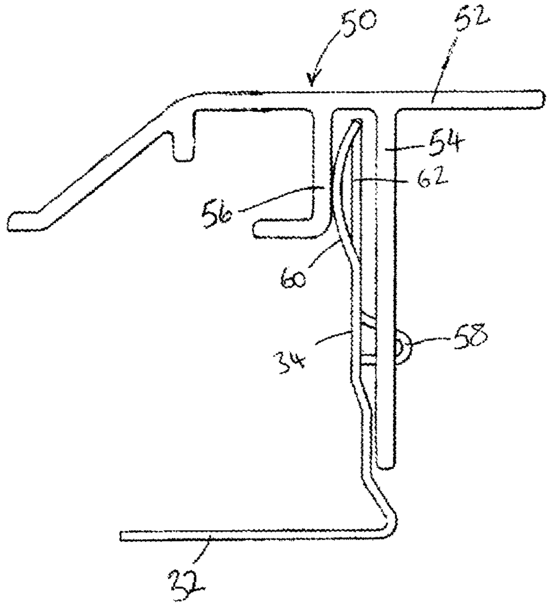
FIG. 7 shows the cross section shown in FIG. 6 with the elongate support members and the locating element removed for clarity.

FIGS. 6 and 7 show a window blind frame member 50 coupled to the mounting bracket 22, which in turn is secured within the channel 20 defined by the elongate support member 18.

The window blind frame member 50 and the mounting bracket 22 are similar to those components as described in WO2006/109009. The method of attachment of the window blind frame member 50 to the mounting bracket 22 is also similar to that described in WO2006/109009.

The window blind frame member 50 includes an outwardly facing member 52 from which depends a first locating wall 54 and a second locating wall 56. The first and second locating walls 54, 56 define between them a gap.

As noted above, the mounting bracket 22 includes the retaining portion 32 and the connecting portion 34. As can be seen in FIGS. 6 and 7, the retaining portion 32 is substantially planar.

The connecting portion 34 defines a first face and a second, opposing face. A locating lug 58 projects from the first face of the connecting portion 34. Additionally, a pair of resiliently deformable engagement arms 60 project include a curved engagement portion which extends outwardly from the second face of the connecting portion 34. A central body portion 62 is located between the engagement arms 60.

As seen most clearly in FIG. 7, the curved engagement arms 60 and a portion of the central body portion 62 are located within the gap defined between the first and second locating walls 54, 56. The curved portions of the engagement arms 60 urge against the second locating wall 56 and resist deflection of the central body portion 62 of the mounting bracket 22 away from the first locating wall 54. Furthermore, the locating lug 58 projects through an aperture (not shown) defined by the first locating wall 54.

It will be appreciated that the engagement of the locating lug 58 with the first locating wall 54 resists displacement of the window blind frame member away from the mounting bracket 22, and the curved engagement arms 60 resist displacement of the central body portion 62 away from the first locating wall 54, which resists the unintentional disengagement of the locating lug 58 from the first locating wall 54.

It will be further noted from FIG. 7 that the locating lug is shaped to have a sloping leading edge which allows for a snap-fit of the locating lug 58 into the aperture defined by the first locating wall 54. However, the trailing edge of the locating lug 58 is arranged to be substantially perpendicular to the aperture, such that the locating lug 58 resists disengagement from the first locating wall 54.

Figure 8:
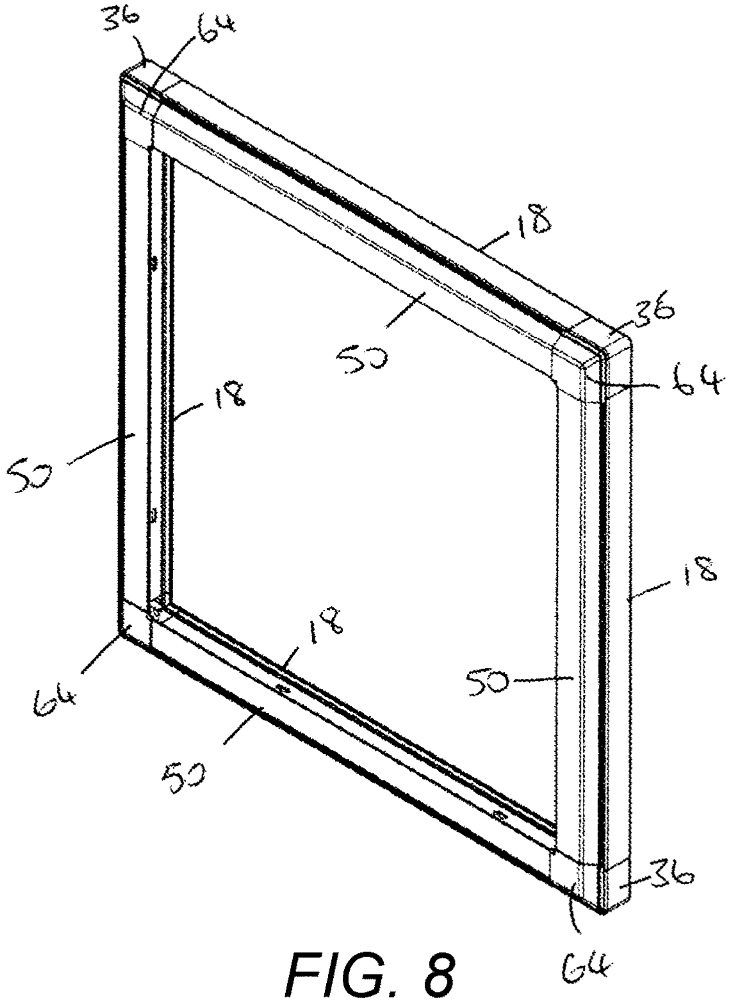
FIG. 8 shows a perspective view of the window blind support assembly shown in FIG. 4 with a window blind frame secured thereto.

FIG. 8 shows the rectangular configuration of the four elongate support members 18 and four corner brackets 36 shown in FIG. 4 with four corresponding window blind frame members 50 secured to the respective elongate support members 18 via the mounting brackets 22. FIG. 4 also shows the four window blind frame members 50 being coupled to each other via respective window blind frame corner brackets 64. Such window blind frame corner brackets are well known (e.g. from WO2006/109009).

Figure 9:
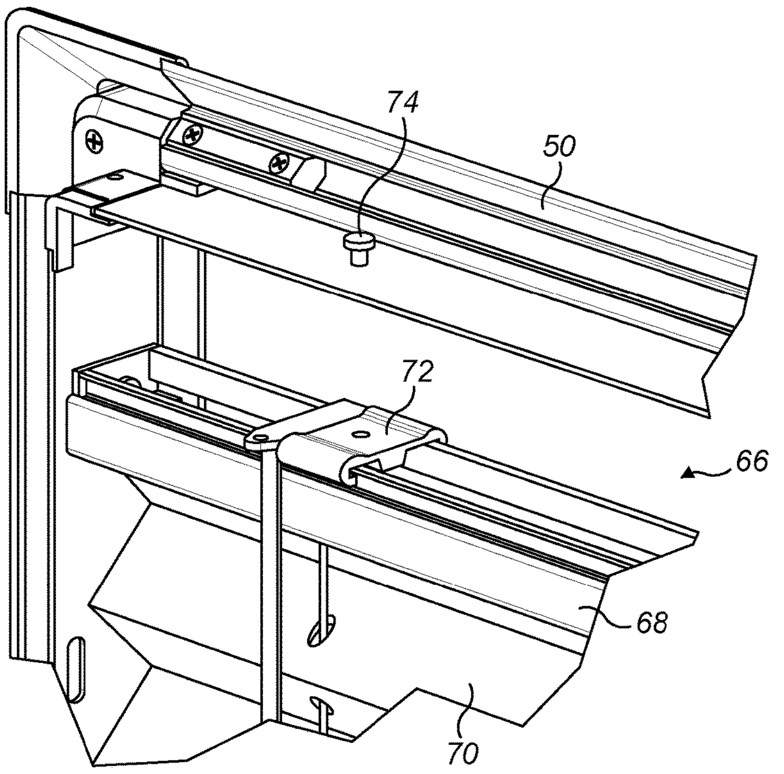
FIG. 9 shows a coupling between a window blind frame and deployable window blind assembly.

FIG. 9 shows a window blind assembly 66 comprising a headrail 68 and a pleated blind substrate 70 which is deployable from the headrail 68 and retractable to the headrail 68. The headrail 68 includes a mounting clip 72 coupled thereto and the mounting clip 72 is secured to the window blind frame member 50 (in use, the upper or top window blind frame member) via a screw 74.

In this way, the window blind frame members 50 are coupled to the rectangular configuration of the elongate support members 18 via the mounting brackets 22 and the window blind assembly 66 is secured to the upper or top window blind frame member 50 via the mounting clip 72.

Figure 10:
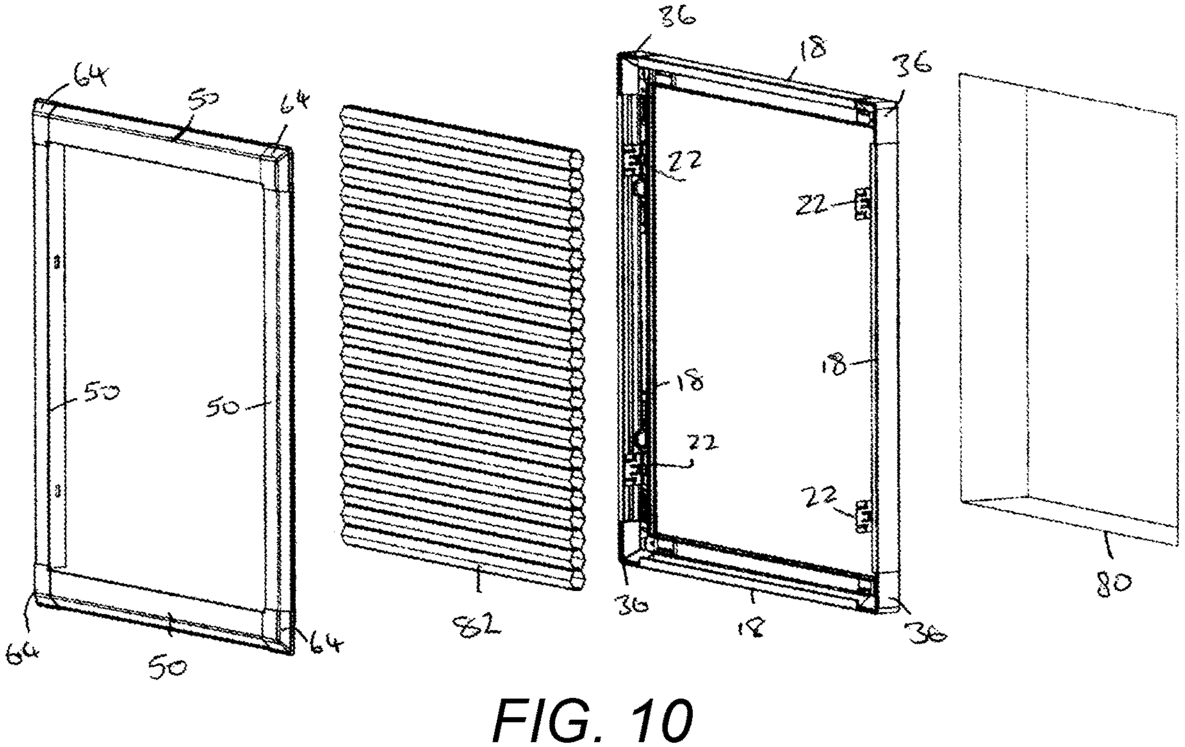
FIG. 10 shows an exploded view of a window, a window blind support assembly and a deployable window blind assembly.

FIG. 10 shows an exploded view of a window 80 to which is secured a window blind assembly comprising a rectangular arrangement of elongate support members 18, a corresponding rectangular arrangement of window blind frame members 50 and a window blind assembly 82. It will be appreciated that the window blind assembly 82 may be the window blind assembly 66 shown in FIG. 9 or it may be a different window blind assembly. The window blind assembly 82 includes a headrail (not shown) which is secured to the upper window blind frame member 50 in a known way, for example, via one or more mounting clips 72 and corresponding screws 74 as shown in FIG. 9.

The invention claimed is:

1. A window blind support assembly including one or more elongate support members which are securable to a substrate surrounding a window or glazing panel; a mounting bracket for securing a window blind to the support assembly; and a locating element for securing the mounting bracket to the support member at a desired position along the support member; wherein one or more of the elongate support members include a pair of spaced apart and opposed side walls, an arm, and a channel floor together defining a longitudinal channel, wherein the arm projects from one of the side walls toward another of the side walls and overlies a part of the channel floor; the locating element is slidably coupled to the respective elongate support member within the longitudinal channel; the locating element includes a resiliently deformable compression element, and one or more resiliently deformable friction members which engage one or both of the side walls and urge the locating element toward an opposed one of the side walls; the mounting bracket defines a retaining portion and a connecting portion; and the retaining portion of the mounting bracket is secured to the support member between the channel floor of the longitudinal channel and the resiliently deformable compression element of the locating element under a spring force applied by the resiliently deformable compression element, whereby the retaining portion of the mounting bracket is secured within the longitudinal channel of the elongate support member at a desired position via the locating element.

2. A window blind support assembly according to claim 1, wherein the locating element includes a tab which projects out of the longitudinal channel.

3. A window blind support assembly according to claim 1, wherein the connecting portion of the mounting bracket projects transversely from one side of the retaining portion and projects out of the channel.

4. A window blind support assembly according to claim 1, wherein the assembly includes two or more elongate support members and each of the support members includes at least one locating element and at least one mounting bracket.

5. A window blind support assembly according to claim 4, wherein a pair of adjacent elongate support members are connected via a corner bracket.

6. A window blind support assembly according to claim 5, wherein the corner bracket includes one or more fixing elements for fixing the support assembly to a substrate.

7. A window blind support assembly according to claim 1, wherein the support assembly further includes a window blind frame member coupled to the elongate support member via the connecting portion of the mounting bracket.

8. A window blind support assembly according to claim 7, wherein the window blind support assembly includes two elongate support members; the elongate support members are connected together via a support member corner bracket; at least one of the support member includes a respective mounting bracket secured thereto via a locating element; the support assembly further includes two window blind frame members connected together via a frame member corner bracket; and each of the window blind frame members is coupled to a respective one of the elongate support members via the connecting portion of the mounting bracket.

9. A window blind support assembly according to claim 8, wherein the assembly includes four elongate support members and four support member corner brackets; the elongate support members are arranged in a rectangular configuration, wherein adjacent ends of the support members are connected together via a respective one of the support member corner brackets; at least two of the support member includes one or more respective mounting bracket secured thereto via locating elements; the support assembly further includes four window blind frame members and four frame member corner brackets; the window blind frame members are arranged in a rectangular configuration, wherein adjacent ends of the window blind frame members are connected together via a respective one of the frame member corner brackets; and the window blind frame members are coupled to the respective elongate support members via the connecting portions of the mounting brackets.

10. A window blind including a window blind support assembly and a deployable blind assembly including a headrail or a roller tube and a blind substrate; wherein the window blind support assembly includes one or more elongate support members; a mounting bracket; and a locating element; wherein one or more of the elongate support members include a pair of spaced apart and opposed side walls, an arm, and a channel floor together defining a longitudinal channel, wherein the arm projects from one of the side walls toward another of the side walls and overlies a part of the channel floor; the locating element is slidably coupled to the respective elongate support member within the longitudinal channel; the locating element includes a resiliently deformable compression element, and one or more resiliently deformable friction members which engage one or both of the side walls and urge the locating element toward an opposed one of the side walls; the mounting bracket defines a retaining portion and a connecting portion; and the retaining portion of the mounting bracket is secured to the support member between the channel floor element of the longitudinal channel and the resiliently deformable compression element of the locating element under a spring force applied by the resiliently deformable compression element, whereby the retaining portion of the mounting bracket is secured within the longitudinal channel of the elongate support member at a desired position via the locating element; wherein the support assembly further includes a window blind frame member coupled to the elongate support member via the connecting portion of the mounting bracket; and wherein the headrail or roller tube of the deployable blind substrate is secured to the window blind frame member.

11. A window blind according to claim 10, wherein the blind substrate of the deployable window blind is deployable from a roller tube and the roller tube is secured to the window blind frame member via roller tube supports.

12. A window blind according to claim 10, wherein the blind substrate of the deployable window blind is deployable from a headrail and the headrail is secured to the window blind frame member via headrail supports.

* * * * *